US008413108B2

(12) United States Patent
Groves et al.

(10) Patent No.: US 8,413,108 B2
(45) Date of Patent: Apr. 2, 2013

(54) ARCHITECTURAL DATA METRICS OVERLAY

(75) Inventors: Mark Groves, Monroe, WA (US);
Daniel Massey, Redmond, WA (US);
Ian Bavey, Sammamish, WA (US);
David Sauntry, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 12/464,105

(22) Filed: May 12, 2009

(65) Prior Publication Data

US 2010/0293519 A1 Nov. 18, 2010

(51) Int. Cl.
*G06F 9/44* (2006.01)
(52) U.S. Cl. .................. 717/104; 717/105; 717/131
(58) Field of Classification Search .................. None
See application file for complete search history.

(56) References Cited

U.S. PATENT DOCUMENTS

| | | | |
|---|---|---|---|
| 6,219,805 B1* | 4/2001 | Jones et al. ................... 717/104 |
| 6,223,143 B1 | 4/2001 | Weinstock et al. | |
| 6,397,202 B1 | 5/2002 | Higgins et al. | |
| 6,993,759 B2 | 1/2006 | Aptus et al. | |
| 7,130,779 B2 | 10/2006 | Beverina et al. | |
| 7,275,020 B2* | 9/2007 | Sutton ........................... 717/105 |
| 7,467,045 B2 | 12/2008 | Tabanou et al. | |
| 2006/0059027 A1 | 3/2006 | Berenbach et al. | |
| 2006/0085323 A1 | 4/2006 | Matty et al. | |
| 2007/0250789 A1* | 10/2007 | Bell et al. ...................... 717/131 |
| 2007/0288283 A1 | 12/2007 | Fitzpatrick | |
| 2008/0215768 A1* | 9/2008 | Reid et al. ..................... 717/104 |
| 2008/0229303 A1* | 9/2008 | Carteri et al. ................. 717/177 |
| 2008/0313599 A1* | 12/2008 | Carteri et al. ................. 717/104 |
| 2010/0223244 A1* | 9/2010 | Sinha et al. ................... 717/105 |
| 2010/0262558 A1* | 10/2010 | Edwards et al. .............. 717/131 |
| 2011/0261049 A1* | 10/2011 | Cardno et al. ................. 345/419 |

OTHER PUBLICATIONS

Rudiger Lincke, Comparing Software Metrics Tools, ACM, 2008, 11 pages, <URL: http://delivery.acm.org/10.1145/1400000/1390648/p131-lincke.pdf>.*

Alexandre Alvaro, A Software Component Quality Framework, ACM, 2010, 18 pages, <URL: http://delivery.acm.org/10.1145/1670000/1668863/p1-alvaro.pdf>.*

S. Chandra, Software Security Metric Identification Framework, ACM, 2009, 7 pages, <URL: http://delivery.acm.org/10.1145/1530000/1523250/p725-chandra.pdf>.*

(Continued)

*Primary Examiner* — Matt Kim
*Assistant Examiner* — Hua Lu

(57) ABSTRACT

A system and method for facilitating analysis of a software project. Intrinsic measures, activity-based measures, or dynamic measures associated with the project are received, including measures associated with physical program units and logical program units of the project. Mappings between physical program units and logical program units are generated. An architectural diagram including logical program units is received, and may include additional mappings of the logical program units. The mappings are used to roll up measures from physical project units to logical project units, and from logical project units to other logical project units. An overlay diagram is generated, including the rolled up measures. The overlay diagram includes the architectural diagram and a representation of rolled up measures associated with each logical project unit on the diagram. The representations employ a graphic format that facilitates a user determining risk areas of the software project. A user may view effects of project changes prior to checking them into source control.

20 Claims, 9 Drawing Sheets

OTHER PUBLICATIONS

Sanjay Kumar Dubey, Assessment of Maintainability Metrics for Object-Oriented Software System, ACM, 2011, 7 pages, <URL: http://delivery.acm.org/10.1145/2030000/2020983/p003-dubey.pdf>.*

Annabella Loconsole, Measuring the requirements management key process area, Google Scholar, 2001, 10 pages, <URL: https://www8.cs.umu.se/~jubo/Projects/QMSE/ESCOM2001.pdf>.*

David Raffo, Coordinating Models and Metrics to Manage Software Project, Google Scholar, 2000, 9 pages, <URL: http://www.sba.pdx.edu/faculty/davidr/draccess/WEB/publications/JOURNAL/SPIPRHVSub.pdf>.*

Sanusi, et al. "A Visualization Tool for Risk Assessment in Software Development ", Retrieved at<<http://ieeexplore.ieee.org/stamp/stamp.jsp?arnumber=4631892&isnumber=4631845>>, 2008 IEEE, pp. 4.

Lamont Judith, "MITRE uses Risk Assessment to Improve Project Outcomes:Best Practice Award ", Retrieved at<<<http://www.kmworld.com/Articles/Editorial/Feature/MITRE-uses-risk-assessment-to-improve-project-outcomesBest-Practice-Award--9256.aspx>>, Jul. 23, 2001, pp. 3.

Wang, et al. "Architectural Level Risk Assessment Tool Based on UML Specifications", Retrieved at<<<http://ieeexplore.ieee.org/ielx5/8548/27042/01201297.pdf?arnumber=1201297>>, 2003 IEEE, pp. 2.

"Software Development Tools", Retrieved at<<<http://www.webdhoom.com/web-development/Software-Development-Tools.html>>, pp. 3.

Gegick Michael, "Predictive Models for Identifying Software Components Prone to Failure during Security Attacks", Retrieved at<<https://buildsecurityin.us-cert.gov/daisy/bsi/articles/best-practices/measurement/1075-BSI.html>>, Oct. 28, 2008, pp. 6.

FDA Software Validation, Retrieved at<<http://www.klocwork.com/solutions/fdaSoftwareValidation.asp>>, pp. 2.

Cai, et al. "ComPARE: A Generic Quality Assessment Environment for Component-Based Software Systems", Retrieved at<<http://www.cse.cuhk.edu.hk/~lyu/paper_pdf/ComPARE.pdf>>, pp. 1-15.

"Enterprise Architect 7.1", Retrieved at<<http://www.sparxsystems.com.au/downloads/whitepapers/EAReviewersGuide.pdf>>, Copyright Sparx Systems 2008, pp. 22.

"SAS Enterprise Miner 5.3", Retrieved at<<http://www.sas.com/resources/factsheet/sas-enterprise-miner-factsheet.pdf>>, pp. 12.

Sheik, et al. "Software Architecture Risk Assessment (SARA) Tool", Retrieved at<<http://www.csee.wvu.edu/swarch/public_html/SARATool/docs/ISRRE2006.pdf>>, pp. 2.

"CAST Application Intelligence Platform", Retrieved at<<http://www.castsoftware.com/Product/Application-Intelligence-Platform.aspx>>, pp. 2.

"McCabe IQ—Enterprise Edition—Software Quality Management, Enterprise Reporting", Retrieved at<<http://www.mccabe.com/iq_enterprise.htm>>, pp. 5.

"Atlassian FishEye—Source Code Repository Insight", Retrieved at<<http://www.atlassian.com/software/fisheye/default2.jsp>>, pp. 2.

Murphy, et al. "Software Reflexion Models: Bridging the Gap Between Source and High-Level Models", Retrieved at<<http://www.cs.ubc.ca/~murphy/papers/rm/fse95.html>>, In the Proceedings of the Third ACM SIGSOFT Symposium on the Foundations of Software Engineering, Oct. 1995, ACM, New York, NY, Jun. 28, 1996, p. 1.

* cited by examiner

ARCHITECTURAL DATA METRICS OVERLAY

TECHNICAL FIELD

The present invention relates generally to software development, and, more particularly, to computer-based analysis of software risks and metrics.

BACKGROUND

Software programs and systems are often quite complex. They may be developed over a long period of time, by numerous developers. Changes to complex systems involve a risk factor, in that there is an increased risk of introducing problems with portions of systems that are complex. It is useful to understand the areas of risk within a software system, and the degree of risk of different areas. Various tools exist that extract or determine metrics associated with areas of a software system. The metrics may be indicative of complexity or other aspects of an area of the code. Developers can use the metrics to make decisions regarding which areas of the system should be revised or replaced, and priorities for such work. With numerous metrics available, tools that assist developers or managers in understanding the complexities and risks associated with various portions of a software system are useful when maintaining systems or developing new systems based on prior systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate analyzing metrics related to a software project. In an example embodiment, this includes providing a visualization of multiple metrics as an overlay on an architectural diagram. An example embodiment includes receiving intrinsic measures indicative of a static structure of the software project and receiving activity-based measures indicative of user activity related to the project. Some embodiments include receiving mapping data that maps logical project units to physical project units. An architectural diagram may be received, the diagram representing logical project units. The mapping data may be used to roll up intrinsic measures and activity-based measures and associate them with logical project units of the diagram. In one embodiment, an overlay diagram is created by combining the architectural diagram with the rolled up measures, and generating a visual representation of the rolled up measures associated with the logical project units.

An example embodiment includes receiving source code of the project, receiving binary files generated from the source code, and generating mapping data by associating logical project units represented in the source code to corresponding locations in the binary files. Mapping data may be generated by associating logical project units represented in the architectural diagrams to locations in the binary files or source code files. In some embodiments, an architectural diagram may include mapping data associating logical project units with corresponding source code logical project units. The mapping data may be extracted from the architectural diagram and used to generate physical-to-logical mapping data that associates binary files with the logical project units of the diagram.

An example embodiment includes generation of a visual representation of metrics data for each logical project unit on an overlay diagram, so that the visual representations have a common format.

In an example embodiment, a client receives auxiliary intrinsic or activity-based measures corresponding to auxiliary portions of the project, and generates auxiliary rollup measure data by using the mapping data to associate the auxiliary measures with the logical project units. The auxiliary measures may be combined with other rollup measure data, and included in an overlay diagram that displays the combined measure distinct from the other rollup measure data.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
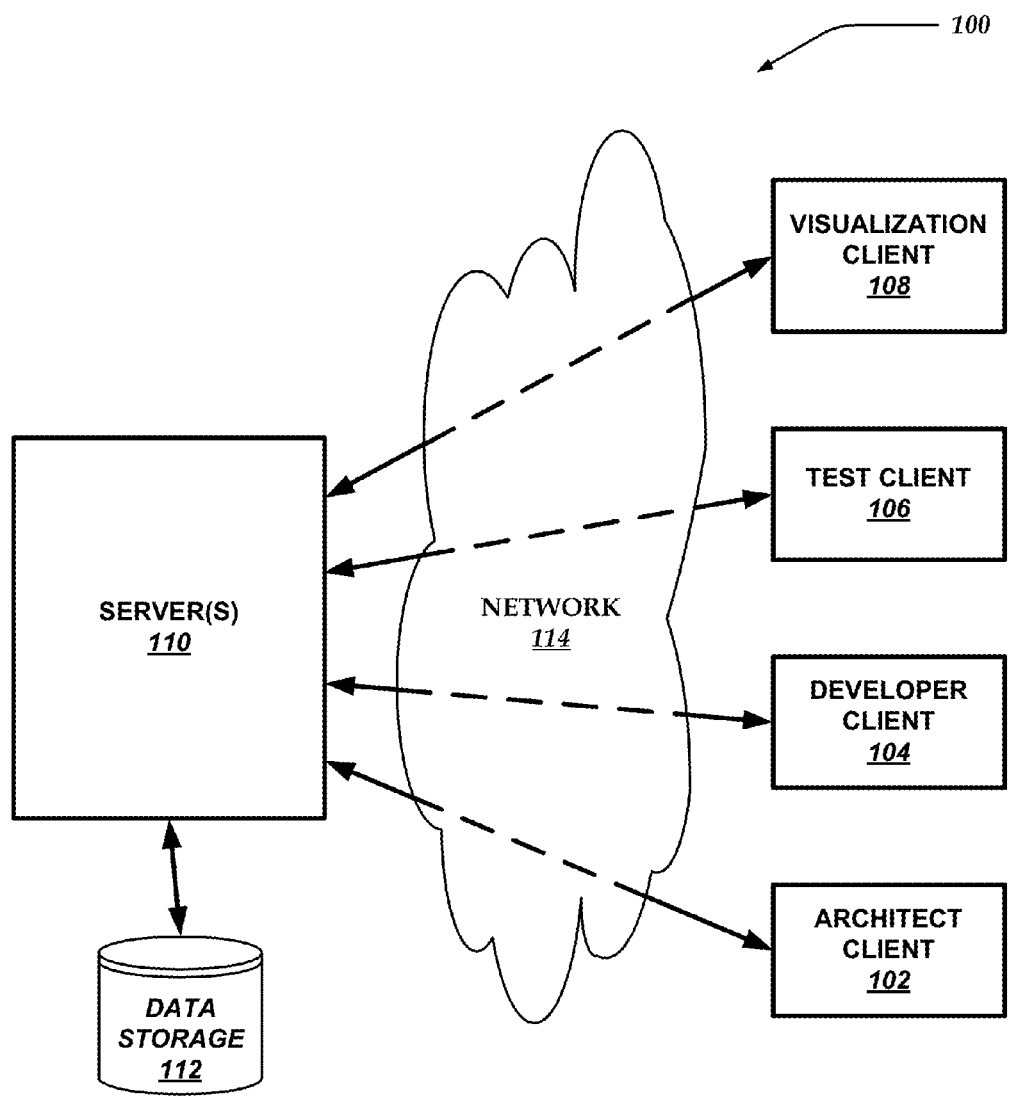
FIG. 1 is a block diagram of a software analysis system, in accordance with one embodiment.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "software project" refers to one or more computer programs, libraries, or portions thereof that are integrated by an overall function or by a common development and maintenance. A software project may include source code, scripts, resource files, architectural diagrams, or a combination thereof. As used herein, the term "project" is equivalent to "software project" unless clearly indicated otherwise.

As used herein, the term "method" refers to a portion of code within a project that performs a specific task, and can execute relatively independently of other portions of the project. A method may, but does not necessarily, return a value. In various computer languages, different terms may be used, such as subroutine, function, procedure, operation, or subprogram. As used herein, the term "method" may include any of these.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

FIG. 1 is a block diagram of a software analysis system 100, in accordance with one embodiment. FIG. 1 is a high level view, and provides a basic understanding of the system, though many configurations may be employed and many details are not illustrated in FIG. 1. As illustrated in FIG. 1, system 100 includes a number of client devices. Specifically, system 100 includes architect client 102, which may be used to provide one or more architectural diagrams or other architectural information to the system. Developer client 104 performs various software development tasks, such as writing, editing, documenting, or organizing source code, testing versions of the software or portions thereof, checking out and checking in source code or other modules from a source code repository, or the like. Test client 106 executes the software, or portions thereof, numerous times, and performs various manual or automated tests. The tests may determine bugs, locate bottlenecks, measure performance, or gather various metrics.

In one embodiment, visualization client 108 is used to display and view one or more visualizations that present one or more metrics together with a view of the system architecture. Visualization client 108 enables a user to associate the metrics together with components of the architecture, determine risk areas, and make various decisions regarding development or maintenance of the software. For example, by using the visualizations, and based on one or more risk factors, a user may decide whether to modify an area of the project, or schedule a modification to be in a particular project version. In one example, if a project area is seen as highly complex and not well documented, a user may decide to postpone modifications of the area until a future project version, rather than include them in a current release. Other examples of decisions include priorities to assign to maintenance of project areas, whether to replace a project are with new development or third party software, a number of people to assign to a maintenance task, or the desirability of adding new features related to the project area.

In the illustrated example embodiment, each of clients 102, 104, 106, 108 communicates with one or more servers 110. One or more of the servers 110 may employ data storage 112, which may reside on one of servers 110 or located on one or more external computing devices. In one embodiment, each communication employs network 114. In various configurations, network 114 may include a local area network, a wide area network, direct communication, wired or wireless technologies, or combinations thereof. Communications may employ protocols such as IP, TCP/IP, UDP, HTTP, SSL, TLS, FTP, SMTP, WAP, Bluetooth, WLAN, other protocols, or a combination thereof. In one embodiment, network 114 includes portions of the Internet FIG. 1 is only an example of a suitable system configuration and is not intended to suggest any limitation as to the scope of use or functionality of the present invention. Thus, a variety of system configurations may be employed without departing from the scope or spirit of the present invention. For example, any of the functions of the client devices may be combined into one or more client devices, distributed, or replicated among multiple client devices in a variety of ways. In some embodiments, additional clients are included, such as a management client that performs project management tasks or an administrative client that performs administrative tasks. In one configuration, the functions of servers 110, or a portion thereof, may be combined into one server or distributed among multiple servers in a variety of ways. Some or all of the functions of servers 110 may be combined with one or more clients into one or more computing devices. As discussed herein, in some embodiments, a client device may include a local version of components that reside on servers 110, and perform similar functions, though on different data.

In one embodiment, each of client devices 102, 104, 106, 108, and servers 110 is a computing device. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system.

Figure 2:
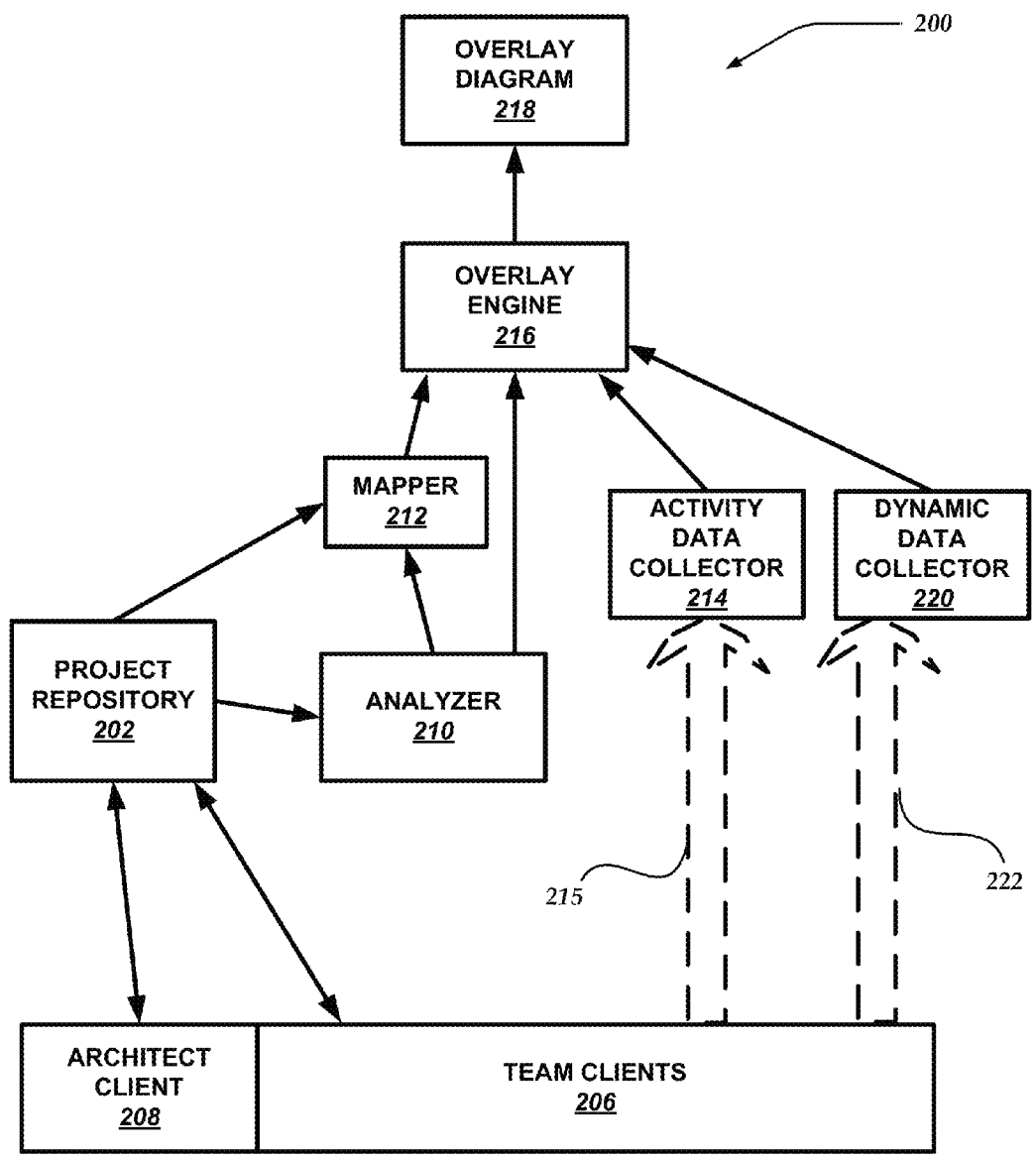
FIG. 2 is a block diagram illustrating a high level view of selected components of a project analysis system, in accordance with one embodiment.

FIG. 2 is a block diagram illustrating a high level view of selected components of a project analysis system 200, in accordance with one example embodiment. The components of FIG. 2 represent functions of a system, and may be performed by hardware and software components distributed among computing devices in a variety of ways, including configurations discussed with respect to system 100, of FIG. 1. FIG. 2 is presented as a high level view, and thus numerous details are not included therein.

As illustrated, example project analysis system 200 includes a project repository 202, which may store source code, compiled binary code, architectural diagrams, scripts, documentation, or other files or data related to a software project. Project repository 202 may receive files or data from developers or various client devices, or from servers, and may distribute files or data to other components of the system directly or through other data repositories or components. In one embodiment, project repository 202 receives one or more architectural diagrams from architect client 208. Program repository 202 may employ a version control system to maintain multiple versions of a project. In one embodiment, each file or component that is part of a project may have an associated version. Metrics may be associated with a specific version of a file or component.

Team clients 206 represent one or more clients that perform various software development tasks. Team clients 206 may include one or more of the clients of FIG. 1, and perform similar functions. At least some of clients 206 may check out files from project repository 202 or check in new or modified files to project repository 202. Architect client 208 is a specific type of team client that creates or edits one or more architectural diagrams of a software project or system of software projects that is being developed or managed. In one embodiment, architect client 208 may use one or more development tools to create or edit Unified Modeling Language (UML) diagrams or other logical or physical diagrams. One such tool is Visual Studio®, by Microsoft Corporation of Redmond, Wash. A number of different types of UML diagrams and other diagrams exist, and architect client 208 may create or edit any one or more types. Examples of UML diagrams include class diagrams, object diagrams, component diagrams, activity diagrams, sequence diagrams, and communication diagrams, though others may also be used. One type of architectural diagram that may be employed is a layer diagram. A layer diagram may be used to specify various layers that make up a project architecture. An architect may define logical boundaries within the software, and associate the software with the layers to validate that constraints defined within the diagram are not violated. A layer diagram may indicate a relationship between each layer representing logical constructs and associated physical units. An architect may include names of logical project units, such as logical subsystems, in an architectural diagram, along with relationships to other logical project units. For example, an architect may specify that a first logical subsystem includes a second logical subsystem, and that the latter includes a specific class or namespace. A namespace is an abstract container providing logical grouping and name disambiguation. The term "package" is sometimes used for a similar concept.

In one embodiment, analyzer 210 receives source code from project repository 202 and performs various analyses thereupon, generating one or more metrics. In one embodiment, analyzer 210 receives an intermediate language representation of source code or compiled assemblies and performs analyses thereupon. Any combination of source code, intermediate language, or compiled assemblies may be analyzed by analyzer 210. Metrics are a measure of a property. Metrics that are obtained by analyzing project code independent of project activity or execution of the project are referred to as "intrinsic" metrics. Some example intrinsic elements are counts of lines of code, lines of comments, conditional branch instructions, method calls, methods, arguments, or the like. Some metrics are calculated as a function of other metrics. Cyclomatic complexity is a measure of the number of linearly independent paths through a unit of the project. Halstead complexity measures are a set of metrics derived from the number of distinct operators, the number of distinct operands, the total number of operators, and the total number of operands. TABLE 1 contains a list of example intrinsic metrics that may be provided by analyzer 210.

TABLE 1

| Intrinsic Metrics | |
|---|---|
| Cyclomatic complexity | Count of the number of linearly independent paths through a program's source code. |
| Halstead Measures | |
| Program length | Total number of operands + Total number of operators |
| Program vocabulary | Number of distinct operands + Number of distinct operators |
| Volume | (Program length) × $\log_2$ (Program vocabulary) |
| Difficulty | ½ (Number of distinct operators) × (Total number of operands)/(Number of distinct operands) |
| Effort | Difficulty × Volume |
| Object Oriented Measures | |
| Abstractness | Ratio of abstract types to all types |
| Attributes inherited | Number of attributes inherited from ancestor classes. |

TABLE 1-continued

| Intrinsic Metrics | |
| --- | --- |
| Cohesion | Measure of how strongly types are related to each other |
| Coupling | Number of other classes that reference or are referenced by a class. |
| Depth of inheritance | Number of class definitions that extend to the root of the class hierarchy |
| Distance from main sequence | Distance from an ideal line where abstractness equals instability: $\|Abstractness + Instability - 1\|/\sqrt{2}$ |
| Fan in/afferent | Number of other classes that reference a class. |
| Fan out/efferent | Number of other classes referenced by a class. |
| Instability | Measure of sensitivity to changes in other project units. |
| Methods inherited | Number of methods inherited from ancestor classes. |
| Number of ancestors | Total number of ancestor classes |
| Number of children | Number of child classes that inherit from a class. |
| Number of descendents | Total number of descendent classes. |
| Line Counts | |
| File | Number of lines in a source code file. |
| Class | Number of lines in a class. |
| Comment lines | Number of comment lines. |
| Comment ratios | Ratio of number of comment lines to total lines. |
| Method | Number of lines in a method. |

A specific occurrence of a metric or a combination of occurrences is referred to as metrics data or a "measure." For example, for the metric of line counts, a specific source code file may have a measure of 75, and a corresponding class may have a measure of 50. In some embodiments, a measure is associated with one or more units of a project. A file is one such unit. Thus, for a particular file, there may be corresponding measure such as number of lines of source code in the file, or a Hallstead complexity measurement of the file. A particular line of a file may be a unit, such that a number of operands in the line may count as a measure corresponding to the line. The same measure may be combined with similar measures with respect to other lines of the file to obtain a measure for the file. Types of project units may be arranged in one or more hierarchies, and multiple hierarchies may overlap. Physical project units or logical project units may be in multiple hierarchies, and a specific project unit may be in more than one hierarchy. For example, a file is higher in a hierarchy than a line of a file, and there is a one-to-many relationship between a file and a line of a file. Applying a measure associated with a first project unit to higher level project unit is referred to as "rolling up" the measure. In a configuration with multiple overlapping hierarchies, a project unit measure may roll up into multiple higher level project units of the same type.

In the embodiment illustrated in FIG. 2, mapper 212 receives various data from project repository 202 and analyzer 210, and maps associations between specifically identified units. The data might include, for example, data that can be used to identify a particular line of source code that corresponds to an instruction in a binary file. Similarly a method may be mapped to a class. Returning to the relationship diagram of FIG. 3, mapper 212 may map associations between any specific instance of a project unit with another instance of a different project unit to which there is a relationship. This includes associations between source files and object-oriented artifacts, such as classes and methods. The mappings enable measures to be rolled up from a first unit to another unit. In one embodiment, analyzer 210 analyzes source code and provides mappings between classes, class members, statements, source files, and lines within source files. In one embodiment, mapper 212 provides mappings of binaries to each of source files, classes, class members, and source file line numbers. In one embodiment, binaries may be mapped to logical units such as subsystems or other components in an architectural diagram.

As further illustrated in the embodiment of FIG. 2, activity data collector 214 receives activity-based metric data. Activity-based metrics refer to measurements of activities performed by people. Examples of activity-based metrics include bug counts, build breaks, test code coverage, and code churn. TABLE 2 provides a longer list of activity-based metrics, though the list of table 2 is not complete. In some embodiments, the system provides a user with an interface for specifying custom metrics or mechanisms for retrieving measures.

TABLE 2

| Activity-Based Metrics | |
| --- | --- |
| Bug counts | Number of bugs found in the project unit. |
| Build breaks | Build breaks resulting from checking in the project unit. |
| Task counts | Number of tasks to build or maintain the project unit. |
| Test code coverage | Amount of code touched by testing. |
| Test counts | Number of tests of a project unit. |
| Test results | Number of test failures. |
| Version control churn | Amount of code changed. |
| Version control code changes | Number of times a project unit changes. |
| (Other work items) | Numbers of other kinds of work items or work item states in the project unit |

In one embodiment, dynamic metrics are retrieved and included with other metrics. Dynamic metrics include measurements that result from execution of the project. Execution of the project refers to running any portion of program code of the project. This may occur during testing, debugging, general use of the project, or other usage. Dynamic data collector 220 may receive dynamic metrics resulting from any such execution of the project. Table 3 provides a list of dynamic metrics, though the list of Table 3 is not complete.

TABLE 3

| Dynamic Metrics | |
| --- | --- |
| Code coverage | Measures blocks that are executed, not executed, or partially executed during any project execution. |

TABLE 3-continued

Dynamic Metrics

| | |
|---|---|
| Method calls | Number of times a method is invoked. |
| Method times | Amount of time spent in a method. |
| Event occurrence | Number of times an exception, I/O call, or other event occurs during execution of a project unit. |

Arrow 215 is a symbolic connection illustrating that activity-based metrics measure events triggered by team clients 206. However, the actual data may be collected from various sources. For example, project repository 202 may provide data descriptive of a number of times that each file is checked in or out of the repository, lines of source code that have changed at each check-in, a number of times a code change caused a build to break, or the like. In another example, a mail system may provide measures indicating a number of times the name of a file or other project unit is included in a header or body of emails; a calendar system may provide measures indicating a number of times the name of a project unit is included in scheduled meetings; a project management system may provide measures indicating an amount of time that a developer allocates to perform a task or an amount of time that a developer used to complete a task; an instant messaging (IM) system or text messaging system may provide measures indicating a number of times a project unit is included in messages; an RSS system may provide measures indicating counts of project unit names included in news, blogs, or other RSS feeds.

In the example embodiment of FIG. 2, overlay engine 216 receives metrics data as input. Overlay engine may thus receive one or more types of intrinsic measures from analyzer 210, one or more types of activity-based measure from activity data collector 214, or a combination thereof. In the illustrated embodiment, overlay engine 216 receives mapping data from mapper 212. Overlay engine 216 may receive one or more architectural diagrams that illustrate an architecture of the software project. In one embodiment, the one or more architectural diagrams are created by a client, such as architect client 208, though the diagrams may be stored on a server or repository such as project repository 202 and received from it. The mapping data corresponds to at least some of the measures received by overlay engine 216 and the one or more architectural diagrams, such that overlay engine 216 may associate measures that it receives with an architectural diagram that it receives.

In one embodiment, overlay engine 216 combines a diagram with metrics data to generate overlay diagram 218. Briefly, an overlay diagram is a diagram that includes an architectural diagram and also includes metrics data that has been processed to provide a user with a view of metrics data in relation to an architecture, enabling the user to assess risks or to otherwise view aspects of the architecture. Overlay diagrams are discussed in further detail herein.

As illustrated in FIG. 2, in one embodiment, overlay engine 216 creates one or more overlay diagrams 218. A client device, such as visualization client 108 (FIG. 1) displays the overlay diagrams to a user. An overlay diagram may be displayed by architect 208, team clients 206, or any other computing device.

In one embodiment, overlay engine 216 receives input from a user and enables interaction with an overlay diagram. Interaction may include zooming an image, selecting an item and drilling down to a next level, or other manipulations of an overlay diagram. In one embodiment, overlay engine 216 allows a user to specify and manipulate measures that are displayed on an overlay or a format for displaying metrics. Interaction with overlays is discussed in further detail herein.

Figure 3:
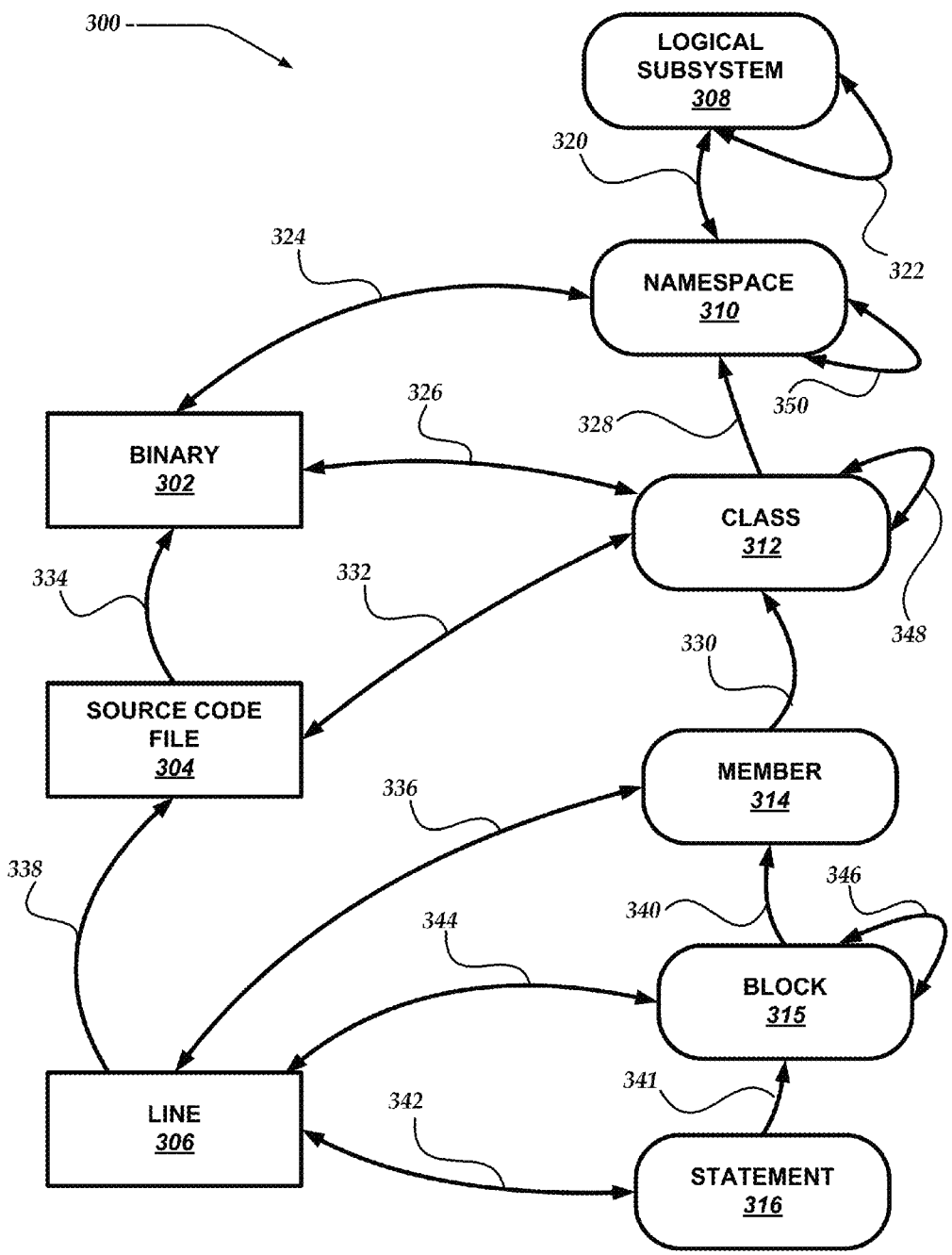
FIG. 3 is a relationship diagram illustrating relationships among various project units, in accordance with some embodiments.

FIG. 3 is a relationship diagram 300 illustrating relationships among various project units, in accordance with some embodiments. The project units correspond to a software project, and may correspond to measures of the project. In the illustrated embodiment, the project units include physical project units and logical project units. The physical project units are binary 302, source code file 304, and line 306. The logical project units are logical subsystem 308, namespace 310, class 312, member 314, block 315, and statement 316. Relationship diagram 300 further includes arrows that represent relationships 320-346 between various project units. As used herein, a statement that a first unit has a one-to-many relationship with a second unit means that an instance of the first unit has an association with one or more corresponding instances of the second unit, and that an instance of the second unit has at most one corresponding association with an instance of the first unit. For example, as illustrated, a source file 304 has a one-to-many relationship 338 with line 302. Thus, a source code file may have one or more lines; each line corresponds to one source code file.

In the illustrated embodiment, a binary 302 has a one-to-many relationship 334 with source code file 304. Thus, one or more source code files may be translated and combined to generate a binary 302. An assembly is an example of a binary 302.

A logical subsystem 308 is a logical portion of a software project. It may be defined by an architect to represent project units that have a common functionality or other common relationship that warrants referencing as a logical unit. Logical subsystems are sometimes referred to as components or layers, though the term "logical subsystem" is used herein to include these terms. Logical subsystems may exist in one or more hierarchies, so that a logical subsystem may be included within one or more logical subsystem. Therefore, as illustrated, logical subsystem 308 has a many-to-many relationship 322 with itself. In one embodiment, two or more levels or layers of logical subsystems may exist.

In one embodiment, a logical subsystem has a many-to-many relationship 320 with namespace 310. As used herein, a statement that a first unit has a many-to-many relationship with a second unit means that an instance of the first unit has one or more corresponding associations with instances of the second unit, and that an instance of the second unit has one or more corresponding associations with instances of the first unit. Namespace 310 may have a many-to-many relationship 324 with binary 302. In the illustrated embodiment, namespace 310 has a many-to-many relationship 350 with itself, allowing namespaces to be nested. Namespace 310 may have a one-to-many relationship 328 with class 312. As used herein, "class" refers to a class as used in object-oriented programming or other such unit of a high level programming language. A class interface is one type of class 312.

A class 312 has a one-to-many relationship 330 with member 314. A member may be referred to as a "class member." A class member may be a method, field, or property of the class in which it is contained. Fields or properties may be defined as data within a defined scope in various programming languages. In the illustrated embodiment, class 312 has a many-to-many relationship 348 with itself, allowing classes to be nested.

In the illustrated embodiment, a member 314 has a one-to-many relationship 340 with block 315 and a many-to-many relationship 336 with line 306. Block 315 has a one-to-many relationship 341 with statement 316 and a many-to-many relationship with line 306. Block 315 also has a one-to-many relationship 346 with itself, reflecting the possibility of having blocks within other blocks. Statement 316 has a many-to-many relationship 342 with line 306.

In one embodiment, class 312 has a many-to-many relationship 332 with source code file 304 and may have a many-to-many relationship 326 with binary 302. Thus, a single source code file may include source code of one or more classes, and a single class may have code that resides in one or more files.

As illustrated, project units have various relationships with other project units. Logical units have relationships with physical units. In the illustrated embodiment, relationships 324, 326, 332, 336, and 342 are relationships between logical units and physical units. Additional relationships may be derived from the illustrated relationships. For example, the one-to-many relationship 330 between class 312 and member 314 can be used together with the one-to-many relationship 340 between member 314 and block 315 to derive a one-to-many relationship between class 312 and block 315. Similarly, a one-to-many relationship between binary and line may be derived, a one-to-many relationship between class 312 and statement 316 may be derived, and a one-to-many relationship between source code file 304 and statement 316 may be derived.

A "pure many-to-many" relationship between two units means that there exists at least one instance of the first unit that has more than one corresponding association with an instance of the second unit, and there exists at least one instance of the second unit that has more than one corresponding association with an instance of the first unit. Corresponding to each many-to-many relationship illustrated in FIG. 3, there is an at least one embodiment in which the many-to-many relationship is a pure many-to-many relationship. For example, in one embodiment, a specific binary 302 corresponds to multiple instances of classes 312, and a specific class corresponds to multiple instances of binary 302. In various embodiments, the system maintains mapping data to roll up measures corresponding to a project unit multiple levels, though some of these levels may include a pure many-to-many relationship with a lower or higher level.

These relationships allow mappings between instances of various project units. In one embodiment, these relationships and mappings are used to associate measures to corresponding project units. The mappings enable measures to be rolled up from one project unit to another project unit. More specifically, the mappings enable measures corresponding to a physical project unit to be rolled up to one or more logical project units; measures corresponding to a logical unit may be rolled up to one or more physical project units. For example, one or more lines of source code may have measures indicative of a complexity. By applying mappings, the measures may be rolled up to a class member, a class, a namespace, and a logical subassembly. The measures may be aggregated and appear as a measure associated with the logical subassembly on an overlay diagram. In another example, a measure indicative of high activity related to a class method may be rolled up from member 314 to binary 302.

Figure 4:
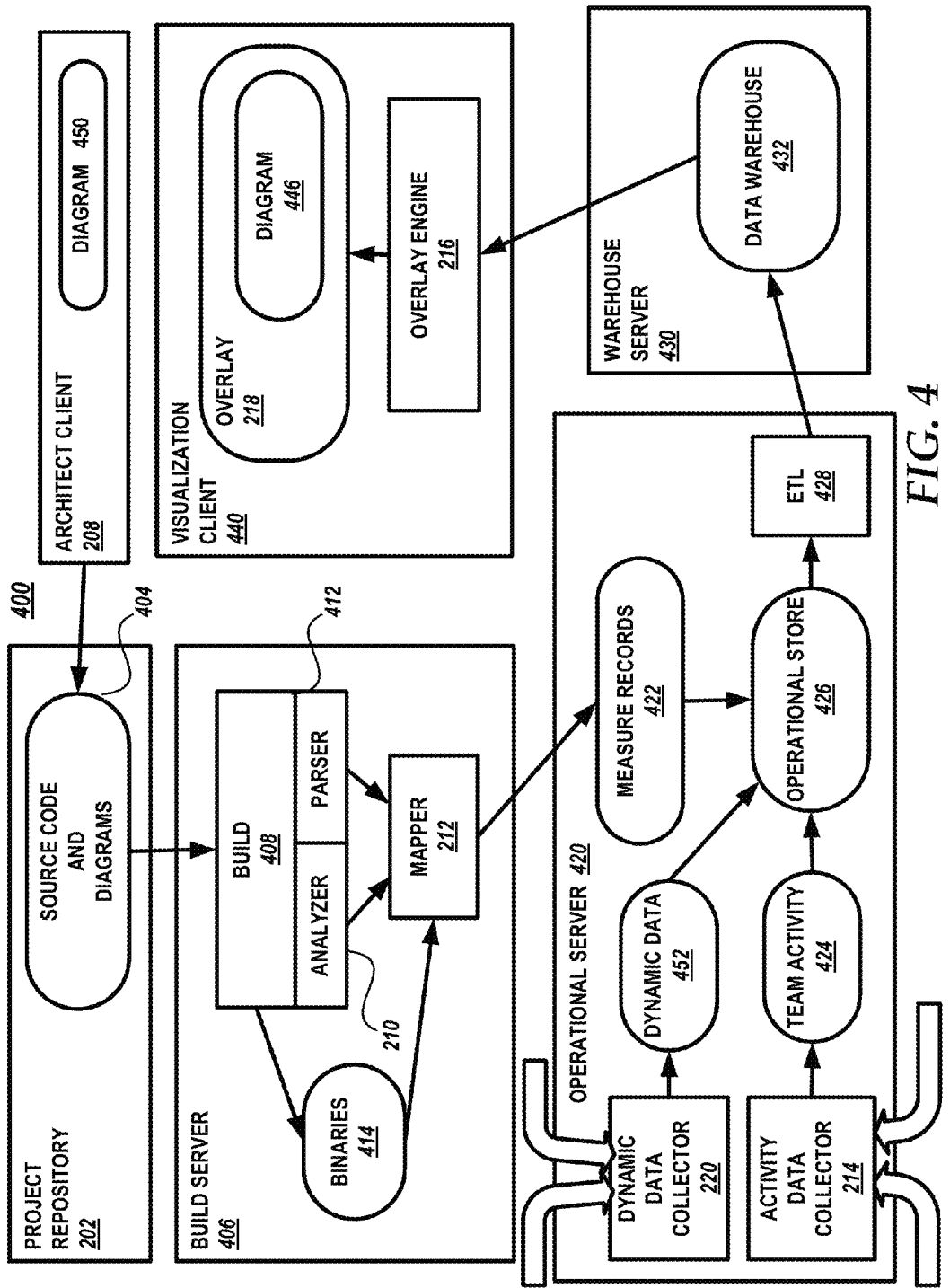
FIG. 4 is a block diagram of a software analysis system, in accordance with one embodiment.

FIG. 4 is a block diagram of a software analysis system 400, in accordance with one embodiment. In various embodiments, software analysis system 400 is the same system as software analysis system 100 of FIG. 1 and software analysis system 200 of FIG. 2, and the discussion of system 100 and system 200 is applicable to software analysis system 400. FIG. 4, however, provides additional detail on components and an example configuration.

Example software analysis system 400 includes project repository 202, build server 406, operational server 420, warehouse server 430, visualization client 440, and architect client 208. Though these servers and clients are illustrated as distinct components, the illustrated components and corresponding functions may be combined, distributed, or replicated among one or more computing devices in a variety of ways, including configurations discussed with respect to software analysis systems 100 and 200. In one embodiment, multiple visualization clients 440 may operate concurrently and independently.

As illustrated, in the example embodiment illustrated, project repository 202 may receive and store project source code and architectural diagrams 404, as well as other project components. Project repository 202 may receive one or more architectural diagrams 450 from architect client 208. Project repository server 202 may send project source code and diagrams 404 and other project components to build server 406.

In one embodiment, build server 406 includes build component 408, parser 412, analyzer 210, and mapper 212. Build component 408 may perform a project build, which includes compiling project source code to produce one or more binaries 414. In one embodiment, parser 408 and analyzer 210 are integrated with build component 408 and perform source code parsing and analysis of the project structure, respectively. In one embodiment, mapper 212 receives the one or more binaries 414, as well as data from analyzer 210 and parser 412. In one embodiment, mapper 212 receives the architectural diagrams or data extracted from the architectural diagrams. Mapper 212 may use the combination of data to map the various project units with each other. As illustrated in FIG. 3, physical project units may be mapped with other physical project units or with logical project units; logical project units may be mapped with physical project units or other logical project units. For example, a file identifier and line number may be mapped to a class method, a class, a namespace, or one or more logical subsystems.

In one embodiment, a user may employ a diagram tool to create or modify an architectural diagram and to include mapping data. For example, in a class diagram, the architect may include the names of classes represented in the diagram. In a layer diagram, the user may specify names of various logical subsystems and indicate names of assemblies or namespaces that each subsystem corresponds to. An architect may specify one or more hierarchies of logical subsystems, and include this data with an architectural diagram. Multiple hierarchies may be interrelated. This provides at least a portion of the mappings between logical subsystems. An architectural diagram may also include mappings between logical subsystems and namespaces.

As illustrated, in one embodiment, mapper 212 sends data that it generates to operational server 420. This data includes measure records 422. Measure records 422 may include data that represents the various mappings between project units. In the illustrated embodiment, operational server 420 includes several data stores: a measure records 422, team activity 424, and operational store 426. Team activity 424 represents received measures pertaining to activity of a development team or other users having a stake in the development of the software project. In the illustrated embodiment, activity data collector 214 receives measures of team activity. Team activity may be received from a variety of sources, and may represent a number of different types of activity and correspond to a variety of activity-based metrics. For example, project repository 202 and build server 406 may send measures indicative of code check-ins or checkouts, and corresponding project units. Build server 406 may send measures indicative of build breaks. Client devices may send measures indicative of testing results, code coverage, or other measures resulting from testing or executing the project or portions thereof.

In the illustrated embodiment, dynamic data collector 220 receives measures related to project execution, as discussed herein. Dynamic data may be received from a variety of sources, including team clients 206. Dynamic data 452 represents received measures of dynamic data.

In the illustrated embodiment, measure records 422, dynamic data 452, and team activity 424 are combined into operational store 426. Thus, operational store 426 may store intrinsic measures, activity-based measures, dynamic data measures, or a combination thereof. Operational store 426 may receive activity-based measures or dynamic data measures and store them in a database as each measure is received. The data of operational store 426 may be maintained in a normalized database format or a denormalized format. In one embodiment, the data of operational store 426 is maintained in a denormalized format with records that efficiently represents each event providing a measure, such as a single code check-in, a single code break, a bug found, or the like. In one embodiment, the database of operational store 426 includes a flat file.

In one embodiment, operational store 426 includes vectors that associate project units with each other, or associate incidents related to a metric with one or more project units. For example, a vector may represent <binaryID><source fileID><classID><methodID>, indicating a correspondence between the identified binary, source file, class, and method. Another vector may represent <source fileID><lineID><operator count>, indicating an incident such as a number of operators in a specified line of a specified source file. Another example illustrates a vector representing an activity-based incident, such as <source fileID><classID><methodID><build break>, indicating a build break corresponding to the specified file, class, and method. This provides mappings between the specified project units as well as associating incidents with the project units. A combination of such vectors includes data that can subsequently be used to determine measures for each project unit. Individual records may be stamped with a timestamp or project version identifier, enabling time or project version to be used as a dimension for data retrieval from the data warehouse 432.

In one embodiment, an architectural diagram 450 may include rules that map at least some of the vectors, or portions thereof, to elements of the diagram. For example, an architectural diagram may include a rule that maps a specific namespace or file to a logical subsystem in the diagram. These rules assist in rolling up measures, as discussed herein.

The data of operational store 426 may be used to produce a report. An example report, for example, may indicate the source or measure of each data record, or a list of measures pertaining to a specified event, such as a build number, or a specified type or range of events, such as builds within a specified time period.

In one embodiment, operational server 420 may include an extract, transform, and load component, referred to as ETL 428. ETL 428 may periodically extract records from operational store 426, transform the data, and load it into a data warehouse 432, which may reside on warehouse server 430. In one embodiment, data warehouse server 430 is a database designed for efficient retrieval of measures, aggregated measures, and trends. Retrieval of trend data may include retrieving one or more measures as they existed at multiple points in time, where the points may be specified as dates, versions, code check-ins, or other milestones. Data warehouse 432 may store records with corresponding version control paths. Object oriented program units or other elements may be stored using fully qualified names. Data warehouse 432 may be configured for data retrieval on one or more specified dimensions, such as data pertaining to a specified build, bug, client task, or project unit. TABLE 3 includes a list of example dimensions, though various embodiments may include other dimensions.

TABLE 3

Data Retrieval Dimensions

| | |
|---|---|
| Build | |
| Bug | |
| Date | |
| Logical Subsystem | |
| Source File | |
| Object-Oriented Project unit | e.g. Class, Method, Property, Field |
| File to Object Oriented Project unit | |
| User Task | |
| Test | |
| Time | |
| Version number, label, indicator | |
| Other work items | |
| Metric Data Types | e.g. Integer, Floating Point |
| Administrative Dimension | e.g. Project, Team, User |

In one embodiment, data warehouse 432 also receives and stores one or more of project source files, architectural diagrams, mappings, or other data discussed herein. In one embodiment, system 400 does not include data warehouse 432. In this embodiment, data for use in overlay diagrams may be retrieved from operational store 426.

The illustrated embodiment includes overlay engine 216. As discussed herein, overlay engine 216 generates an overlay diagram, such as overlay 218. Overlay 218 includes architectural diagram 446, or a modified version thereof. In the illustrated embodiment, overlay 218 is displayed on visualization client 440, which may be visualization client 108 of FIG. 1.

In one embodiment, system 400 includes a component that automatically generates an architectural diagram. This action may receive data from one or more sources, such as source code and diagrams 404, build 408, parser 412, analyzer 210, mapper 212, or data warehouse 432. The automatically generated architectural diagram may be combined with a diagram provided by architect client 208, or used without the latter diagram. Overlay engine 216 may use the automatically generated diagram to generate overlay 218. In one example, a user may specify a method and, in response, the system may generate a sequence diagram that is input to the overlay engine.

Figure 5:
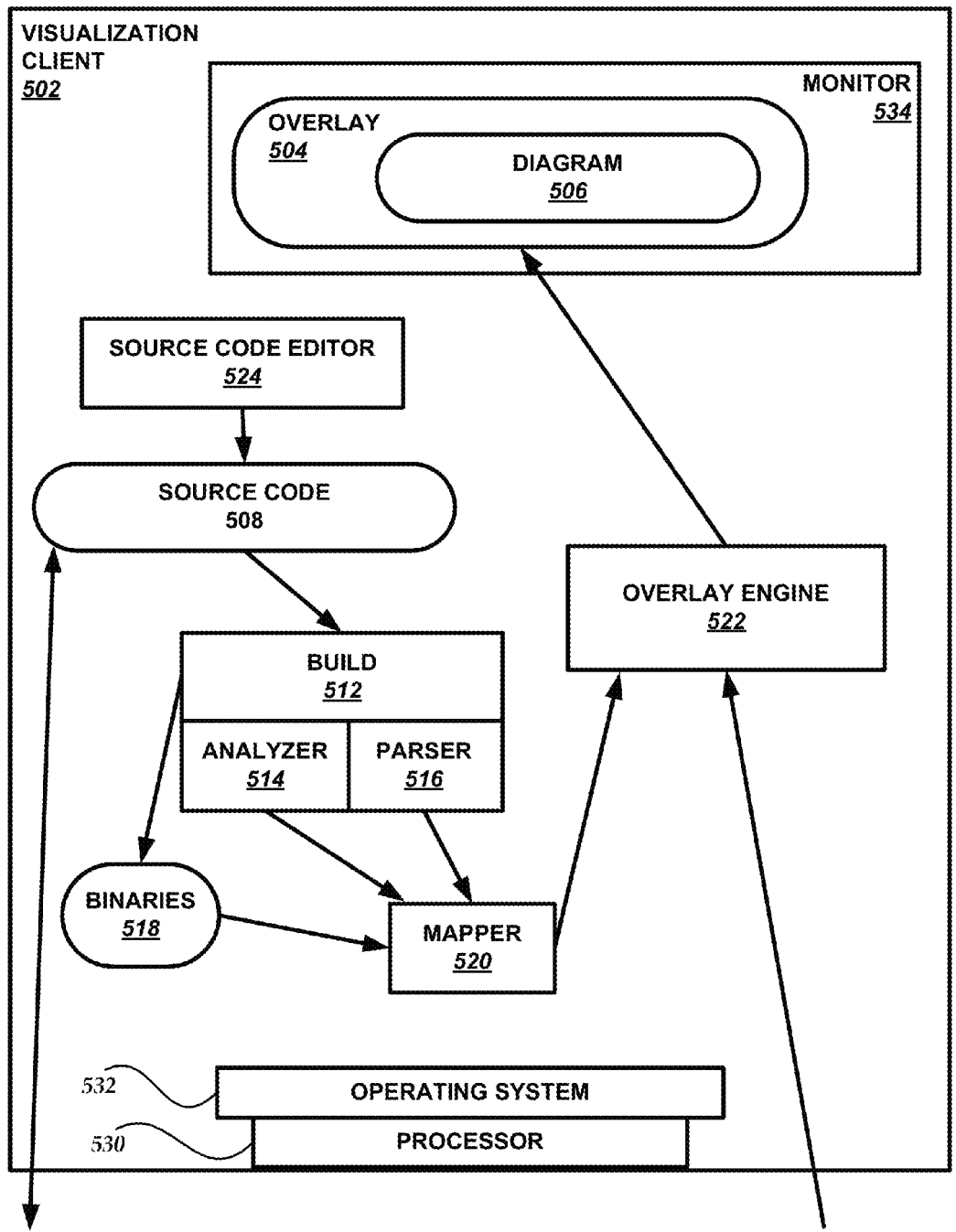
FIG. 5 is a block diagram of a visualization client, in accordance with one embodiment.

FIG. 5 is a block diagram of an example visualization client 502, in accordance with one embodiment. Visualization client 502 may be the same as visualization client 440, of FIG. 4, or a variation thereof, and the discussion of visualization client 440 is applicable to visualization client 502, unless clearly stated otherwise.

As illustrated in FIG. 5, visualization client 502 includes overlay engine 522, which may receive metric data and one or more architectural diagrams from a data warehouse, such as data warehouse 432 (FIG. 4). Visualization client 502 generates overlay 504, which includes architectural diagram 506, or a modified version thereof. Overlay engine 522, overlay 504, and architectural diagram 506 are similar to overlay engine 216, overlay 218, and diagram 446, of FIG. 4, and the discussion of the latter components are applicable to the former. In one embodiment, overlay 504 is displayed by monitor 534.

Visualization client 502 also includes source code 508. At least a portion of source code 508 may be received from source code and diagrams 404. Source code 508 may include all of source code and diagrams 404, or a portion thereof. In the illustrated embodiment, visualization client includes a source code editor 524, which may be used to modify source code 508 or create additional source code that is included in source code 508. Thus, source code 508 may be a variation, or different version, of source code and diagrams 404. Visualization client 502 may employ a source code control process (not shown) to check in or check out source code, scripts, or other components from project repository 202.

In the illustrated embodiment, visualization client 502 includes build component 512, analyzer 514, parser 516, and mapper 520. These components are similar to corresponding build component 408, analyzer 210, parser 412, and mapper 212, respectively, of FIG. 4. The discussion of the functions of each of these components in FIG. 4 is applicable to the corresponding components of FIG. 5, except that they operate on local data, where such local data exists. In one embodiment, build component 408, analyzer 210, parser 412, and mapper 212 operate on source code and other data that is common to team clients 206. The corresponding components (build component 512, analyzer 514, parser 516, and mapper 520) may operate on a combination of local files and data and common files and data. Build component 512 receives source code 508 and creates binaries 518. Parser 516 and analyzer 514 operate on source code 508, and provide data to mapper 520. Mapper 520 also receives binaries 518. In some embodiments, at least a portion of binaries 414 is received by mapper 520 and processed together with locally generated binaries.

In the illustrated embodiment, visualization client 502 includes overlay engine 522, which performs operations similar to that discussed for overlay engine 216. Overlay engine 522 may receive local input, such as measure records, from mapper 520. Overlay engine 522 may also receive input from data warehouse 432, as discussed with respect to overlay engine 216. Overlay engine 522 may generate overlay 504, which includes diagram 506.

Thus, visualization client 502 may generate one or more overlay diagrams that are similar to overlay 218, but include modifications or additions to source code. The overlay diagrams produced may inform a developer as to changes in complexity, coverage, Halstead values, or other changes that occur as a result of the local modifications. As an example of the use of visualization client 502, a developer may perform modifications or additions to source code, generate and view one or more overlay diagrams, and review measures prior to checking in the modified or new source code. Based on the information provided in the overlay diagrams, the developer may decide to revise the modifications, not to check in the changes, delay checking in the code, check in the changes into a selected version, or take other development actions. For example, the overlay diagrams may provide information that the modifications significantly increase the risk of a logical subsystem or other project unit, and the developer may decide on a specific project version that is to receive the modifications, or to not check in the changes, based on this information.

In one embodiment, visualization client 502 may include an activity data collector, such as activity data collector 214, that receives activity measures, or proposed activity measures, of the developer or visualization client 502. For example, activity measures may include measures from running the revised project locally, measures relating to an amount of time or resources used to modify and test the project, or problems encountered related to modifying, building, and running the project. The activity data collector may also include measures based on a proposed check-in of the modifications, such as code churn measures. In one embodiment, visualization client 502 may receive modifications or local measures from another client, combining the received source code or data to produce an overlay that reflects activity by another client device.

As used herein, the term "auxiliary" is used to describe source code, architectural diagrams, or project components generated or modified on visualization client 502, and that are distinguished from corresponding source code and project components, referred to as "common components," in project repository 202 that are shared by other clients, Auxiliary components may be components that are not checked in to the project repository 202. As used herein, the term "checked in" refers to a specific version of a file or other component. For example, a file may be checked out of a project repository, and subsequently modified. When the file is modified, it is considered not checked in, though the previous version of the file is checked in. In one embodiment, auxiliary components includes files or data that is checked into a branch of the project repository that is distinguished from another branch that is used to create binaries and perform analysis as illustrated in build server 406 (FIG. 4). Intrinsic, dynamic, or activity-based measures that are derived from auxiliary project components are referred to as auxiliary measures.

In one embodiment, overlay engine 522 may present metric data representative of measures excluding the auxiliary measures in addition to measures that include the auxiliary measures. This may enable a user to compare the two sets of measures, and take actions based on the comparison. In one embodiment, overlay engine 522 may distinguish a first set of modifications by visualization client 502 with a second set of modifications, and generate an overly that enables comparison of measures corresponding to each modification, enabling actions based on the comparison.

In the illustrated embodiment of FIG. 5, visualization client 502 includes processor 530, which performs actions of the components included in visualization client 502 as described herein. Processor 530 may execute instructions of the software project, though the actions of generating an overlay, as well as parsing, analyzing, and mapping may be performed without executing the project. In one configuration, processor 530 may include one or more central processing units, one or more processor cores, an ASIC, or other hardware processing component and related program logic. In one configuration, processor 130 may include a multi-threaded processor, enabling actions described herein to be implemented with multiple concurrent threads. In the illustrated embodiment, visualization client 502 also includes operating system 532, which may be a general or special purpose operating system. Operating system 532 may be executed by processor 530, and may provide various system functions and interfaces to the components described herein.

Figure 6:
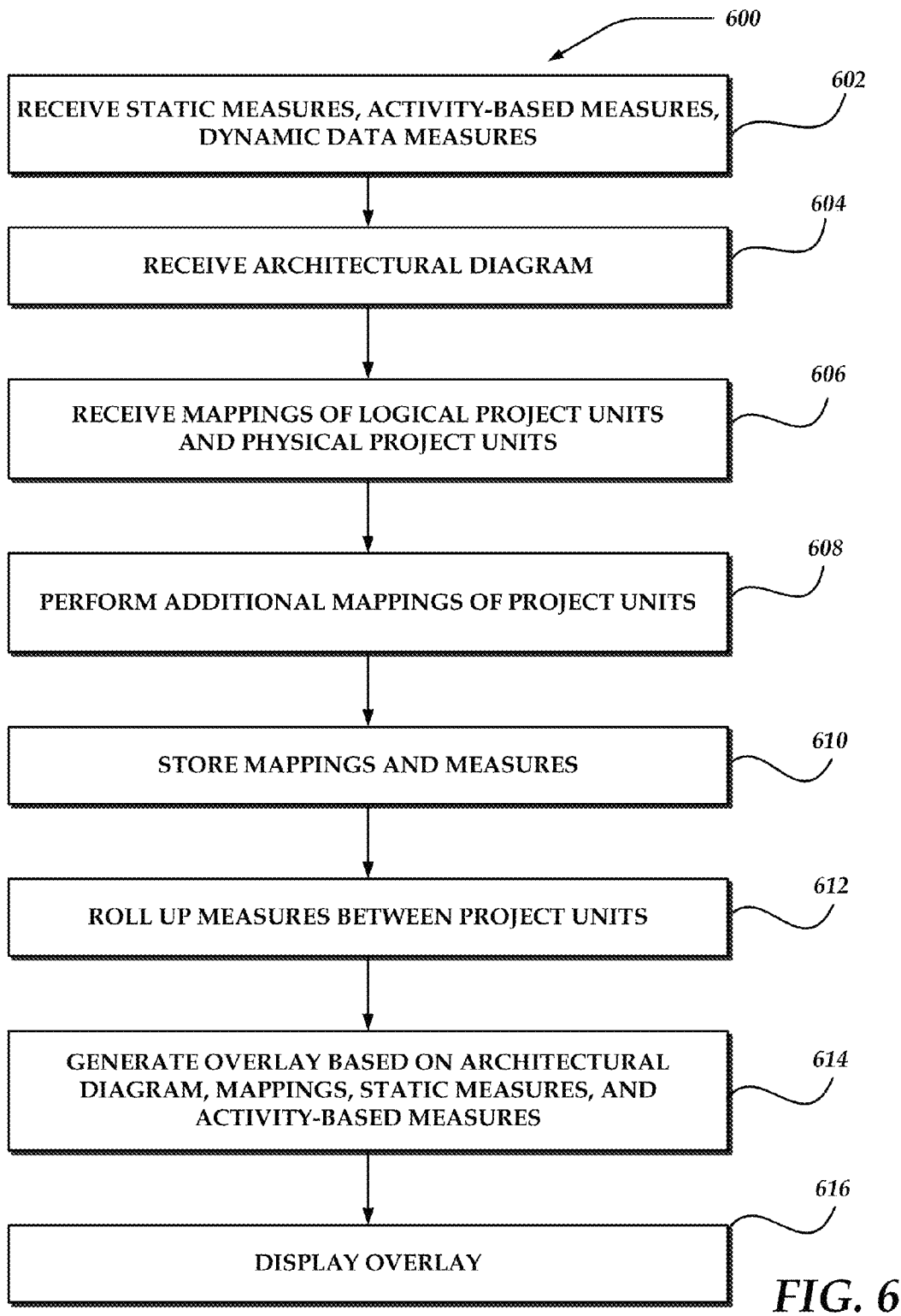
FIG. 6 is a flow diagram illustrating a process for generating an overlay diagram, in accordance with an example embodiment.

FIG. 6 is a flow diagram illustrating a process 600 for generating an overlay diagram, in accordance with an example embodiment. Process 600 may be performed by components of system 200 (FIG. 2), system 400 (FIG. 4), or visualization client 502 (FIG. 5), or a combination or variation thereof.

As shown in FIG. 6, at block 602, one or more intrinsic measures may be received, and one or more activity-based measures may be received. One or more dynamic data measures may be received. Table 1, Table 2, and Table 3 enumerate some examples of intrinsic measures, activity-based measures, and dynamic data measures, respectively, though other measures not listed may be received. In one embodiment, one or more of the received measures may be determined by one or more components of the system. For example, analyzer 210 of FIGS. 2 and 4 may extract data relating to source code and determine one or more intrinsic measures. In one embodiment, activity data collector 214 receives measures from one or more components of system 400 or from components external to the system.

The process may flow from block 602 to block 604, where an architectural diagram may be received. As discussed herein, an architectural diagram may be received directly or indirectly from an architect client or a component that automatically generates an architectural diagram from source code or other data descriptive of a software project. In one embodiment, an architectural diagram may be received from computer storage, having previously been received from another source and stored in the computer storage.

The process may flow from block 604 to block 606, where mappings of logical project units and physical project units may be received from one or more sources. As examples of mapping sources, in various embodiments, architectural diagrams may provide mappings of logical subsystems with other logical subsystems, logical subsystems to namespace or logical subsystem to binaries; a parser or analyzer may provide mappings of classes to class members, class members to statements, class members to lines, statements to lines, or source code files to lines.

The process may flow from block 606 to block 608, where additional mappings of project units may be performed. For example, in one embodiment, this includes mapping binaries to source files, mapping binaries to classes, or mapping binaries to namespaces. In one embodiment, these mappings, or a portion thereof, are performed by mapper 212 of FIGS. 2 and 4.

The process may flow from block 608 to block 610, where the mappings and measures may be stored in computer-readable storage. As illustrated in FIG. 4, in one embodiment, this may include storing data in an operational store, such as operational store 426, and translating the data to a data warehouse, such as data warehouse 432.

The process may flow from block 610 to block 612, where the stored measures may be rolled up between project units. As discussed herein, rolling up measures may include applying measures that are associated with a first project unit to one or more other project units. For example, a measure associated with a line of code may be applied to a class, namespace, or a logical subsystem. These actions enable the various intrinsic, dynamic, or activity-based measures to be associated with each logical subsystem. In one embodiment, rolling up of measures may occur during a retrieval of measures from a data warehouse by an overlay engine, such as overlay engine 216 of FIGS. 2 and 4

The process may flow from block 612 to block 614, where an overlay diagram is generated. In one embodiment, the overlay diagram is based on an architectural diagram, mappings, and measures. The measures may be one or more intrinsic measures, one or more activity-based measures, one or more dynamic data measures, or a combination thereof. In one embodiment, display of the overlay diagram may be performed by overlay engine 522 of FIG. 5. In one embodiment, overlay engine 522 send the overlay diagram to another process for display.

The process may flow from block 614 to block 616, where the generated overlay diagram is displayed. It may, for example, be displayed on monitor 534 of visualization client 502. In one embodiment, display of an overlay diagram is an iterative, interactive process. For example, a first portion of an overlay diagram may be displayed. A user may then interact with the displayed overlay diagram, selecting one or more elements or entering one or more commands. In response, an overly engine may modify the display, displaying additional metric data, changing a format of the displayed measures, removing some displayed measures, or performing other modifications to the visual portion of the display. In one embodiment, in response to a command to expand a logical subsystem or other element, a different level of the overlay diagram may be displayed at a lower level. The reverse process may also occur. After block 616, the process may exit, return to a calling program, or repeat. In one embodiment, an overlay diagram, or a portion thereof, may be printed or sent to another server or client device.

Figure 7:
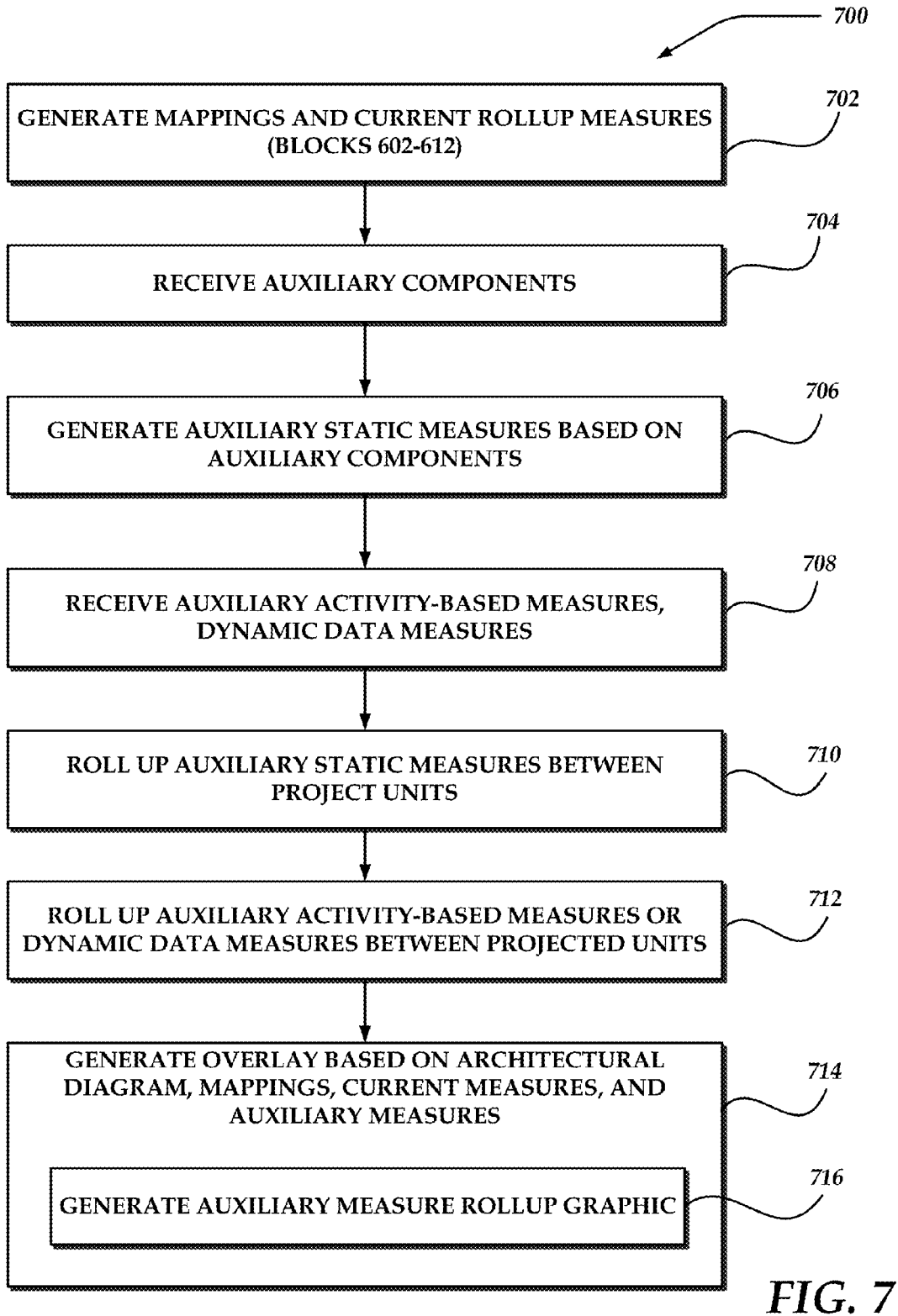
FIG. 7 is a flow diagram illustrating a process for generating an overlay diagram, in accordance with an example embodiment.

FIG. 7 is a flow diagram illustrating a process 700 for generating an overlay diagram, in accordance with an example embodiment. Process 600 may be performed by components of system 200 (FIG. 2), system 400 (FIG. 4), or visualization client 502 (FIG. 5), or a combination or variation thereof.

As shown in FIG. 7, at block 702, a set of mappings is generated. Rollup measures relating to project components and team activity may be generated. In one embodiment, the actions of block 702 include the actions of blocks 602-612, of FIG. 6, as described herein. The measures thus produced are referred to as "current measures." They may be derived from common source code and diagrams 404 (FIG. 4) that are stored in project repository 202 or from team activity. Thus, various clients may have equivalent current measures.

The process may flow from block 702 to block 704, where auxiliary project components are received. These may include source code, other files, or data that is modified or created on visualization client 502.

The process may flow from block 704 to block 706, where auxiliary intrinsic measures based on the auxiliary components are generated. The generation of the auxiliary intrinsic measures is similar to the generation of common intrinsic measures, but is performed on the local, auxiliary components or a combination of auxiliary components and common components.

The process may flow from block 706 to block 708, where auxiliary activity-based measures, based on the activity of client 502 or on auxiliary client activity, may be received. The client activity may include such measures as build breaks, test code coverage, or the like. In one embodiment, auxiliary client activity includes activity that is projected to result if auxiliary components are checked into the project repository. This may include, for example, code churn. In one embodiment, an interface provides a user with a way to specify estimates of activity that may be performed in order to complete a task, as well as associated project units. Thus, the system may provide projections of measures even prior to work being performed on related project units. In one embodiment, the system may receive from a user an auxiliary architectural diagram including changes from a common architectural diagram. An overlay diagram may be generated based on the auxiliary architectural diagram, providing a view of effects due to a proposed architectural change.

In one embodiment, the actions of block 708 include receiving auxiliary dynamic data measures, based on one or more executions of the project by client 502 or other clients. These measures may be processed, rolled up, and included in overlay diagrams, as discussed for auxiliary activity-based measures.

The process may flow from block 708 to block 710, where auxiliary intrinsic measures are rolled up between program units. This may include measures from common project components as well as auxiliary components. For example, measures from a modified file and a common file may be combined.

The process may flow from block 710 to block 712, where auxiliary activity-based measures or dynamic data measures are rolled up between program units. As for the intrinsic measures, this may include auxiliary activity in addition to team activity. Though FIG. 7 illustrates an embodiment in which auxiliary intrinsic measures, auxiliary dynamic data measures, and auxiliary activity-based measures are used to generate an overlay, in some embodiments, process 700 may be performed on intrinsic measures, activity-based measures, dynamic data measures, or a combination thereof.

The process may flow from block 712 to block 714, where an overlay is generated, based on architectural diagram mappings, current intrinsic measures, current activity-based measures, and at least one of auxiliary intrinsic measures or auxiliary activity-based measures. In one embodiment, auxiliary dynamic data measures are included. In one embodiment, the overlay includes an auxiliary measure rollup graphic.

Figure 10:
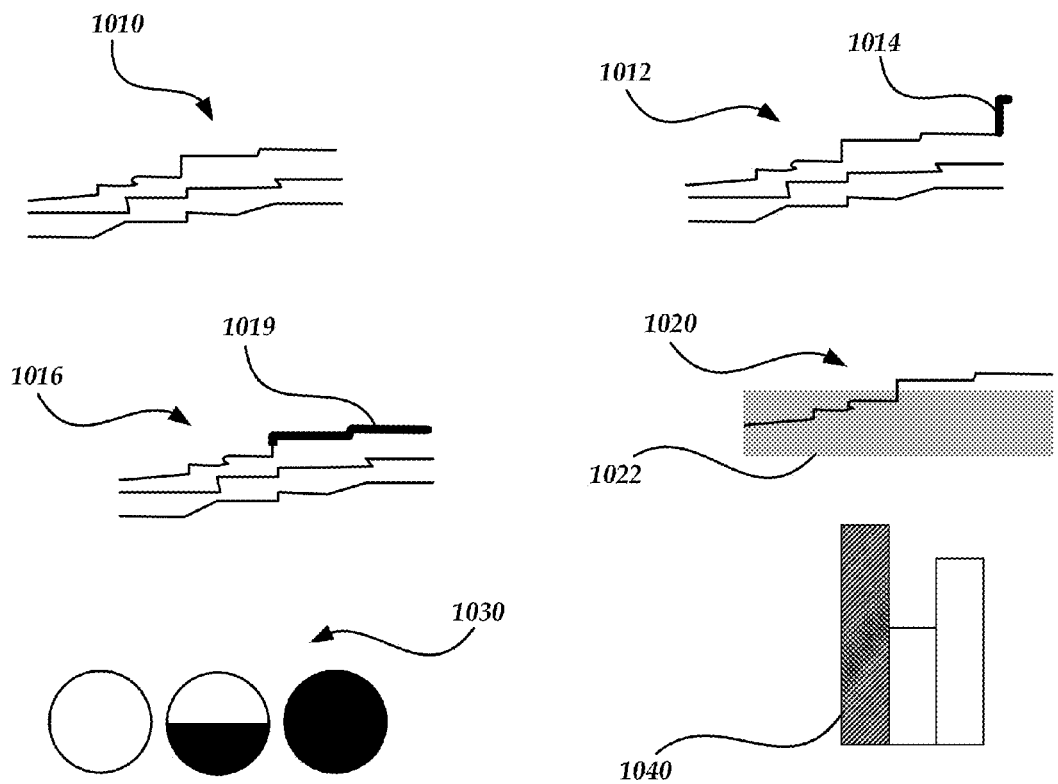
FIG. 10 is a pictorial illustration of various measure graphics generated in accordance with example embodiments.

In one embodiment, the actions of block 714 include actions of block 716. In block 716, a composite measure rollup graphic is generated, such that it includes and distinguishes rollup measures including auxiliary measures from rollup measures (current measures) that exclude auxiliary measures. Rollup measure 1012, of FIG. 10, illustrates an example composite measure rollup graphic, with a segment 1014 that represents the effects of including auxiliary values of one measure.

After block 714, the process may exit, return to a calling program, or repeat. Though the discussion above refers to a process 700 in which auxiliary measures are generated or retrieved from one client, in some embodiments, auxiliary measures may be retrieved from multiple clients. For example, in some configurations, multiple users of multiple clients may work on proposed changes to a software project. Auxiliary intrinsic measures, auxiliary dynamic data measures, or auxiliary activity-based measures may be received from the multiple clients, and included in the process 700.

In one embodiment, a user may provide one or more auxiliary architectural diagrams that are processed as described herein to provide names of logical subsystems and mappings between the logical subsystems with each other or with other project units. Various embodiments enable a user to select the sources for data that is to be included in an overlay diagram, including architectural diagrams, project source code, and activity-based measures. Some example combinations that a user may specify include: an auxiliary architectural diagram with measures from the project repository; a common architectural diagram with auxiliary measures; a combination of auxiliary measures and measures from the project repository together with an auxiliary architectural diagram or an architectural diagram from the project repository; or an auxiliary architectural diagram and auxiliary measures.

Figure 8:
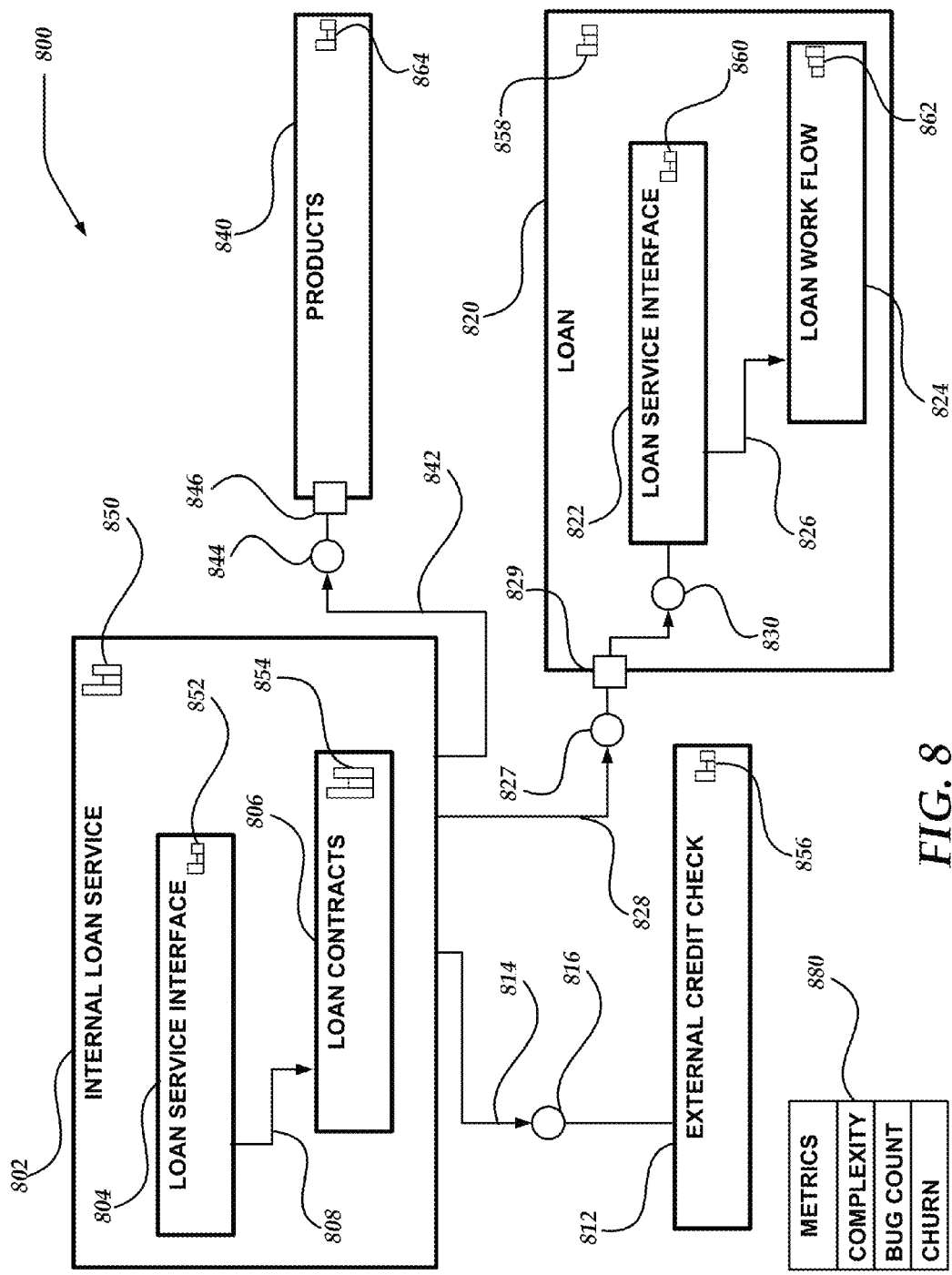
FIG. 8 is a pictorial illustration of an overlay diagram generated in accordance with an example embodiment.

FIG. 8 illustrates an example overlay diagram 800 that may be generated and displayed in one embodiment. Overlay diagram 800 is one example of overlay diagram 218. More specifically, it is an example of an overlay diagram that may be generated based on an architectural diagram in the form of a UML component diagram, though it may be generated based on other architectural diagrams. To simplify the figure and discussion, FIG. 8 illustrates only a portion of an overlay diagram that may be created from a UML diagram. Additionally, elements in FIG. 8 are not necessarily drawn to scale, or may differ in other ways to simplify the figure. It is to be noted that the alphabetic text that is included in FIG. 8 is text that may appear on an overlay diagram, and are not names of elements in the figure.

As illustrated, example overlay diagram 800 includes logical subsystem 802, labeled as "Internal Loan Service." Logical subsystem 802 is one type of logical project unit that may be represented on an overlay diagram. In one embodiment, logical subsystem 802 is placed on an architectural diagram as discussed herein. It is to be noted that UML standards include project units that are referred to as "components" or "subsystems." As used herein, the term "logical subsystem" refers to UML components or subsystems.

As discussed herein, logical subsystems may exist in one or more hierarchies, so that a logical subsystem may include one or more other logical subsystems. In example overlay 800, "Internal Loan Service" logical subsystem 802 includes "Loan Service Interface" logical subsystem 804 and "Loan Contracts" logical subsystem 806. "Loan" logical subsystem 820 includes "Loan Service Interface" logical subsystem 822 and "Loan Work Flow" logical subsystem 824. Example overlay 800 also includes "External Credit Check" logical subsystem 812 and "Products" logical subsystem 840.

Lines and symbols on overlay 800 represent various relationships or properties. For example, the "Loan Service Interface" logical subsystem 804 depends upon "Loan Contracts" logical subsystem 806, as indicated by dependency relationship 808. Similarly, the example overlay 800 includes a dependency relationship 814 between "Internal Loan Service" logical subsystem 802 and "External Credit Check" logical subsystem 812; a dependency relationship 828 between "Internal Loan Service" logical subsystem 802 and "Loan" logical subsystem 820; a dependency relationship 842 between "Internal Loan Service" logical subsystem 802 and "Products" logical subsystem 840; and a dependency relationship 826 between "Loan Service Interface" logical subsystem 822 and "Loan Work Flow" logical subsystem 824. Implemented interface symbols 816, 827, 830, and 844 correspond to "External Credit Check" logical subsystem 812, "Loan" logical subsystem 820, "Loan Service Interface" logical subsystem 822, and "Products" logical subsystem 840, respectively. Interface provided symbols 829 and 846 correspond to "Loan" logical subsystem 820 and "Products" logical subsystem 840, respectively.

The example overlay 800 also includes a measure graphic 850 within the "Internal Loan Service" logical subsystem 802. A measure graphic is a graphic representation of one or more metrics corresponding to a project unit. Measure graphic 850 is one example of such a representation. It represents three metrics corresponding to the "Internal Loan Service" logical subsystem 802, and shows the three metrics as a bar chart. As illustrated in FIG. 8, and discussed in further detail herein, measure graphics can be in any of a number of representation types, such as bar charts, Sparklines, ratings, or other representations.

In example overlay 800, measure graphics 852, 854, 856, 858, 860, 862, and 864 each correspond to an element of the overlay, specifically a logical subsystem, and are depicted along the right edge of their corresponding element, though in various implementations, placement may vary. In one embodiment, each measure graphic has a common format. That is, each measure graphic represents the same set of metrics, in the same order, and employs the same representation type (though the actual measure values may differ for each one). In the illustrated embodiment, legend 880 indicates the names of the metrics that are represented in each measure graphic. In this example, complexity, bug count, and churn are represented, in that order.

Figure 9:
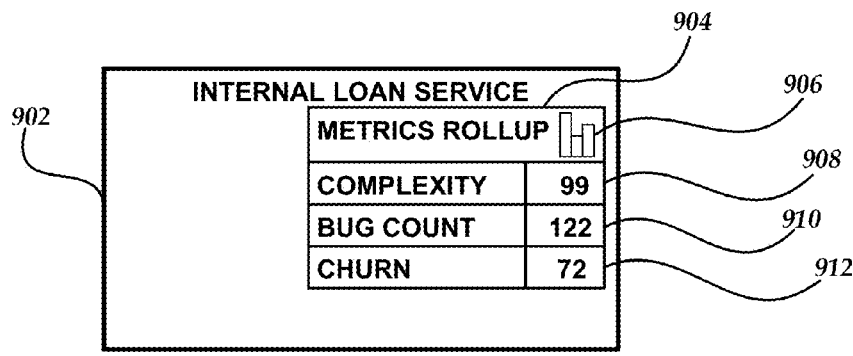
FIG. 9 is a pictorial illustration of a portion of an overlay diagram generated in accordance with an example embodiment.

In various embodiments, each of the measure graphics may be located within or proximate to the corresponding logical program unit. The design and placement of the measure graphics in FIG. 8 creates a spatial stability. It facilitates a user performing a visual scan of the example overly 800 to determine whether one or more corresponding logical program units have one or more measures that stand out as being significantly different from others. In particular, a user may determine the logical program units that have high degrees of risk. In the example overlay 800, a user may visually determine that the measure graphics 850 and 854 indicate significantly higher values than the other measure graphics on the overlay. These measure graphics correspond to "Internal Loan Service" logical subsystem 802 and "Loan Contracts" logical subsystem 806, respectively. Because the latter is included in the former, the measures for "Loan Contracts" logical subsystem 806 may be causing both measures to be high. As illustrated in FIG. 9, in some embodiments, the measure graphics that indicate high values may be automatically modified or displayed in a way that brings attention to it. For example, shading, colors, or animation may indicate high values. In one embodiment, overlay engine 522 applies heuristics or configuration data to determine measures that have a high value, and generates the indications based on this determination.

In one embodiment, overlay 800 is part of a user interface that enables a user to interact with and modify the display. For example, a user may select an element such as a logical subsystem and enter a command to "drill down" to a lower level, in which included logical subsystems or other project units are shown in a lower level overlay. A user may also enter a command to move up the project unit hierarchy, to a higher level. Various implementations of moving up or down the project unit hierarchy may be employed. In the discussion of FIG. 8, description of the features of logical subsystems, such as the display and manipulation of metric data, is applicable to similar displays of classes, class members, source lines, or other project units, unless stated otherwise.

An overlay diagram may include levels of project units other than logical subsystems. For example, drilling down from a display of logical subsystems such as overlay 800 may result in one or more namespaces or classes being displayed, in a manner similar to the logical subsystems of overlay 800. An overlay may include any level of project units, or combinations thereof, and may include logical project units or physical project units.

In one embodiment, example overlay includes a legend 880, which lists the metrics that are displayed in the measure graphics on the overlay, in the order displayed. One embodiment enables a user to select or create an overlay configuration. An overlay configuration may include specifications of metrics to be displayed, a format of measure graphics, or interactive behavior of an overlay. For example, one embodiment provides a mechanism to enable a user to specify or change the displayed metrics. An interface may, for example, present a user with a list of available metrics, and receive input from the user designating one or more metrics or combinations of metrics to be displayed. A group of metrics is referred to as an "aspect." In one embodiment, a list of aspects may be presented to a user, enabling a user to select from the list. The list may be populated with aspects that include meaningful combinations of metrics. Each aspect may have associated rules to facilitate rolling up the values of each aspect into a summary measure indicator for the aspect. An overlay may then be generated that includes the selected aspect. In one embodiment, a user may create a custom aspect by selecting individual metrics or a summary measure indicator. One embodiment enables a user to specify whether metrics are to be displayed as a snapshot or as a trend over time.

FIG. 9 illustrates a portion of an overlay diagram that may be generated and displayed. "Internal Loan Service" logical subsystem 902 may be the same as "Internal Loan Service" logical subsystem 802 of FIG. 8. In one embodiment, in response to a user selection of a project unit, such as a logical subsystem, or its corresponding measure graphic, an additional measure graphic is displayed on, or in proximity to, the selected project unit. This additional graphic is referred to as a "rollover measure graphic." A selection may be made by rolling a pointer over the item, using a mouse or other selection mechanism to click on the project unit, or by another selection mechanism. A rollover measure graphic may include additional information descriptive of the measures in a displayed measure graphic. For example, the additional information may include metric names, numeric values of measures, or trends. In the example of FIG. 9, rollover measure graphic 904 is displayed. Rollover measure graphic 904 includes a measure graphic 906, which may be the same graphic as measure graphic 850 of FIG. 8. The example rollover measure graphic 904 also includes names and values for each of the measures represented by the measure graphic. As illustrated, "complexity" measure value 908, "bug count" measure value 910, and "churn" measure value 912 are displayed. In another example, a measure graphic such as measure graphic 850, showing a snapshot view of measures, may be displayed on an overlay diagram, and a corresponding rollover measure graphic may show trends for one or more of the measures. Measure graphic 1010, of FIG. 10, is one example of a measure graphics that shows trends.

FIG. 10 illustrates various embodiments of measure graphics that may be generated and displayed in various embodiments. Measure graphic 1010 is an example of a Sparkline, representing three metrics. This Sparkline is a combination of three line graphs, reduced to a size that allows embedding into the overlay. In some embodiments, Sparklines may be used as the measure graphics or the rollover measure graphics on an overlay diagram. A Sparkline is a useful graphic for displaying trends of metrics. A trend of metrics may indicate one or more measures as they existed at multiple points in time, where the points may be specified as dates, versions, code check-ins, or other milestones. A Sparkline may also facilitate viewing correlations between metrics. For example, one line in a Sparkline may show bug counts, while other lines show code complexity and code churn. A user may see a high correlation between bug counts and one of the other two metrics. This may inform the user that there is a higher risk in increasing the metric that is highly correlated with bug counts, enabling the user to make decisions accordingly. In an overlay diagram that shows this example Sparkline for multiple project units, a user may quickly see whether similar correlations exist for the various project units.

Measure graphic 1012 is another example Sparkline. As discussed herein, in some embodiments, an overlay engine generates an overlay that indicates auxiliary measures based on a proposed check-in of source code or other project files. In one embodiment, a Sparkline may indicate both auxiliary measures and current measures. In measure graphic 1012, bolded line segment 1014 indicates auxiliary measures of one metric, based on a proposed check-in of files. The auxiliary measures may result from combining auxiliary measures with the current measures to produce composite rollup data. In various embodiments, segment 1014 may be indicated using color or other visual techniques. The rest of the Sparkline indicates the current measures prior to the check-in. Thus the current measures are distinct from the auxiliary measures data. This enables a developer or other user to evaluate the effects of a check-in prior to performing the check-in, and make decisions related to checking in based on this information. Current measures and auxiliary measures may be shown for intrinsic measures or for activity-based measures. For example, a Sparkline may show the current churn for a project unit, as well as the auxiliary churn after a proposed check-in of files is performed. In some embodiments, current and auxiliary measures may be shown with measure graphics other than Sparklines. For example, a bar chart may indicate with color or shading a portion of a composite measure due to auxiliary measures.

Measure graphic 1016 is a Sparkline similar to measure graphic 1010. It includes a line segment 1018 that is bolded to indicate a high measure value. As discussed above, bolding, colors, or other techniques may be used to bring attention to an area. In some embodiments, the system may be configured with data, heuristics, or rules to determine a threshold of high values for one or more metric. In some embodiments, a user may specify one or more thresholds or rules. Based on this, an overlay engine may indicate the items that exceed the specification.

Measure graphic 1020 is another Sparkline. A highlight ribbon 1022 indicates a range that is considered to be desirable. This enables a user to easily see portions that are excessive, and at what point in a trend the measures became excessive. A highlight ribbon may also be used on a bar graph or other types of measure graphics.

Measure graphic 1030 is an example of a ratings graphic. In this example, shadings, colors, or patterns represent corresponding ranges of measure values. For example, a solid circle may represent a high range of values, an empty circle may represent a low range, and a partially shaded circle may represent a middle range. Measure graphic 1040 is another example graphic, in which measures are presented in a bar chart format. Shading, colors, or patterns may be used to indicate measures having high values, or values representing high risks.

Figure 11:
FIG. 11 illustrates three example elements of an overlay diagram, in accordance with an example embodiment.

In one embodiment, elements of an overlay diagram may be colored, shaded, or marked to indicate values of measures or aspects. For example, multiple shades of red may be used, such that the darkest shade indicates values of highest risk or most interest, based on a configuration. Multiple colors or other types of markings may perform similar functions, presenting a visualization of the metrics. This facilitates a user locating diagram elements for which attention may be desired. FIG. 11 illustrates three example elements of an overlay diagram, in which shades of gray indicate a value of a measure or aspect, based on a configuration. In FIG. 11, element 1106 has a light shade, representing a low value; element 1104 has a dark shade, representing a high value; and element 1102 has a medium shade, representing an intermediate value.

In one embodiment, an interface may enable a user to create a custom metric or aspect by entering a query or filter. For example, a user may specify a range to limit the measures included in an overlay. In another example, a query or filter may be used to include or exclude measures corresponding to one or more program units, project versions, builds, or other dimensions from an aspect to be displayed. For example, in overlay 800, of FIG. 8, a user may specify that measures attributable to "Loan Contracts" logical subsystem 806 are to be excluded from displayed measures, in order to see how this affects other measures.

In some embodiments, software analysis system 400 may employ heuristics to identify patterns of metrics corresponding to project units, or specifically to overlay elements, that indicate potential design problems. The system may prioritize pattern matches and present selected ones to a user as recommendations. If the user accepts one or more recommendations, the system may track progress toward improving the metrics related to the recommendations, and inform the user of progress. For example, a measure graphic similar to measure graphic 1020 may indicate a range that represents a desired goal for a metric. The trend graphic may also indicate a time at which a recommendation was provided or accepted, so that progress since that time may be viewed. Various other techniques may be used to present this information.

It will be understood that each block of the flowchart illustrations of FIGS. 6 and 7, and combinations of blocks in the flowchart illustrations, can be implemented by software project instructions. These program instructions may be provided to a processor to produce a machine, such that the instructions, which execute on the processor, create means for implementing the actions specified in the flowchart block or blocks. The software project instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method for analyzing metrics related to a project having a plurality of logical project units and a plurality of physical project units, comprising:
    a) receiving intrinsic measures indicative of a static structure of one or more portions of the project;
    b) receiving activity-based measures indicative of user activity related to the project;
    c) receiving an architectural diagram representing at least a first portion of the plurality of logical project units;
    d) receiving mapping data that maps at least a second portion of the plurality of logical project units to one or more of the plurality of physical project units;
    e) generating, for each of the first portion of the plurality of logical project units, a corresponding set of rollup measure data by determining one or more of the intrinsic measures and one or more of the activity-based measures associated with the logical project unit, based on the mapping data; and
    f) combining the architectural diagram with the set of rollup measure data corresponding to each of the first portion of the plurality of logical project units to generate an overlay diagram, the overlay diagram including, for each of the second plurality of logical project units, a corresponding visual representation of the corresponding set of rollup measure data.

2. The computer-implemented method of claim 1, each visual representation indicative of one or more trends of one or more of the intrinsic measures or one or more of the activity-based measures.

3. The computer-implemented method of claim 1, further comprising receiving dynamic measures indicative of results from execution of the project; and
    generating the set of rollup measure data further comprises determining one or more of the dynamic measures associated with the logical project unit, based on the mapping data, the dynamic measures including one or more of an amount of time spent in the logical project unit, a number of times an exception occurs in the logical project unit, or a number of times an I/O call occurs in the logical project unit.

4. The computer-implemented method of claim 1, further comprising generating each visual representation of the corresponding rollup measure data to include at least one of a bar chart, or a ratings graphic format, the format of each visual representation in common with each other visual representation.

5. The computer-implemented method of claim 1, generating the overlay diagram further comprising selectively shading each of the representations of the second portion of the plurality of logical project units based on the set of rollup measure data.

6. The computer-implemented method of claim 1, wherein the one or more intrinsic measures is derived from source code of the project stored in a project repository, the one or more portions of the project are checked into a source code control system, further comprising:
  a) receiving one or more auxiliary intrinsic measures indicative of a static structure of one or more auxiliary portions of the project, the auxiliary portions of the project not checked into the source code control system;
  b) generating auxiliary rollup measure data from the one or more auxiliary intrinsic measures, based on the mapping data;
  c) combining the auxiliary rollup measure data with the rollup measure data into a composite rollup measure data; and
  d) combining the architectural diagram with the composite rollup measure data to generate an overlay diagram that displays the rollup measure data distinct from the composite rollup measure data.

7. The computer-implemented method of claim 6, further comprising: receiving one or more auxiliary dynamic measures indicative of one or more executions of the one or more auxiliary portions of the project; and generating the auxiliary rollup measure data from the one or more auxiliary dynamic measures.

8. The computer-implemented method of claim 1, further comprising:
  a) extracting diagram mapping data from the architectural diagram, the diagram mapping data associating the first portion of the plurality of logical project units with corresponding source code logical project units;
  b) extracting the source code logical project units from source code of the project;
  c) generating physical-to-logical mapping data that associates binary files of the project to the corresponding source code logical project units and the first portion of the plurality of logical project units, based on the diagram mapping data and the source code logical software units.

9. The computer-implemented method of claim 1, each of the intrinsic measures associating a corresponding measure with a corresponding physical project unit of the physical project units, the overlay diagram based on an association between each of the first portion of the plurality of logical project units and a corresponding physical project unit.

10. (Original) The computer-implemented method of claim 1, wherein at least one of the one or more physical project units has a pure many-to-many relationship with at least one of the first portion of the plurality of logical project units.

11. A computer-based system for analyzing a project, the system comprising an overlay engine programmed to perform actions including:
  a) receiving one or more intrinsic measures indicative of a static structure of one or more portions of the project;
  b) receiving one or more activity-based measures indicative of user activity related to the project;
  c) receiving mapping data that maps each of a plurality of logical project units to one or more physical project units;
  d) receiving an architectural diagram including a representation of each of the plurality of logical project units;
  e) associating each of the plurality of logical project units with a corresponding set of the received activity-based measures and a corresponding set of the received intrinsic measures;
  f) combining the architectural diagram with the received activity-based measures and the received intrinsic measures to generate an overlay diagram, the overlay diagram comprising the architectural diagram and, for each of the plurality of logical project units, the corresponding set of the received activity-based measures and the corresponding set of the received intrinsic measures displayed in a graph proximate to the logical project unit representation; and
  the system further comprising a processor.

12. The system of claim 11, the actions further including receiving dynamic measures indicative of results from execution of the project; and associating each of the plurality of logical project units with a corresponding set of the received dynamic measures.

13. The system of claim 11, the actions further including: storing the one or more intrinsic measures and the one or more activity-based measures in one or more denormalized databases; extracting and translating the one or more intrinsic measures and the one or more activity-based measures into translated data; and storing the translated data in a normalized database.

14. The system of claim 11, the actions further including:
  a) receiving one or more binary files generated from source code of the project;
  b) generating at least a portion of the mapping data by associating each of the plurality of logical project units to a corresponding received binary file.

15. The system of claim 11, wherein the architectural diagram is a Unified Modeling Language (UML) diagram created by a user.

16. The system of claim 11, the actions further including:
  a) extracting one or more auxiliary intrinsic measures from an auxiliary source code file;
  b) combining the one or more auxiliary intrinsic measures with at least one set of the received intrinsic measures to generate one or more composite measures; and
  c) displaying each of the one or more composite measures in a corresponding graph to distinguish the composite measures from the received intrinsic measures.

17. A computer-based system, including a processor, for analyzing a project having physical project units and logical project units, comprising:
  a) means for mapping the physical project units to the logical project units;
  b) means for receiving intrinsic measures and activity-based measures associated with the physical project units;
  c) means for receiving an architectural diagram including a set of logical project units;

d) means for associating the intrinsic measures and the activity-based measures with corresponding logical project units of the set of logical project units; and
e) means for generating, for each of the set of logical project units, a corresponding set of rollup measure data by determining one or more of the intrinsic measures and one or more of the activity-based measures associated with the logical project unit;
f) means for generating an overlay diagram that combines the architectural diagram with each set of rollup measure data, the overlay diagram including, for each logical project unit of the set of logical project units, a visual representation of the intrinsic measures corresponding to the logical project unit.

18. The system of claim 17, further comprising means for generating the architectural diagram from source code of the project.

19. The system of claim 17, further comprising a normalized database configured for data retrieval on each of a plurality of dimensions, including dimensions of source file, object-oriented project unit, date, and logical subsystem.

20. The computer-based system of claim 17, the means for mapping comprising a mechanism that maintains vectors of logical project units and combines the vectors to associate physical project units with each of the logical project units.

* * * * *